US012628749B2

(12) United States Patent
     Cass

(10) Patent No.:     US 12,628,749 B2
(45) Date of Patent:        May 19, 2026

(54) PLANT GROWTH MEDIA AND METHOD FOR MAKING SAME

(71) Applicant: Nanollose Limited, Nedlands (AU)

(72) Inventor: Gary Andrew Cass, Nollamara (AU)

(73) Assignee: Nanollose Limited, Nedlands (AU)

( * ) Notice: Subject to any disclaimer, the term of this patent is extended or adjusted under 35 U.S.C. 154(b) by 27 days.

(21) Appl. No.: 16/500,019

(22) PCT Filed: Apr. 11, 2018

(86) PCT No.: PCT/AU2018/050329
     § 371 (c)(1),
     (2) Date: Oct. 1, 2019

(87) PCT Pub. No.: WO2018/187841
     PCT Pub. Date: Oct. 18, 2018

(65) Prior Publication Data
     US 2020/0163291 A1      May 28, 2020

(30) Foreign Application Priority Data

Apr. 11, 2017    (AU) ................................. 2017901318

(51) Int. Cl.
     *A01G 24/20*        (2018.01)
     *A01G 24/27*        (2018.01)
     *A01G 24/60*        (2018.01)
(52) U.S. Cl.
     CPC ............. *A01G 24/27* (2018.02); *A01G 24/20* (2018.02); *A01G 24/60* (2018.02)
(58) Field of Classification Search
     CPC ........ A01G 24/27; A01G 24/60; A01G 24/22; A01G 24/20

USPC ........................................ 47/58.1 R, 58.1 SC
See application file for complete search history.

(56) References Cited

U.S. PATENT DOCUMENTS

| | | | | |
|---|---|---|---|---|
| 4,196,543 A | * | 4/1980 | Dedolph | ................ A01G 24/44 |
| | | | | 47/87 |
| 4,655,758 A | * | 4/1987 | Ring | ...................... A61K 8/731 |
| | | | | 604/374 |
| 4,863,565 A | * | 9/1989 | Johnson | ................. C12N 1/205 |
| | | | | 604/289 |
| 6,153,413 A | | 11/2000 | Watanabe et al. | |
| 7,607,259 B2 | * | 10/2009 | Savich | ................... A01G 24/35 |
| | | | | 47/58.1 R |

(Continued)

FOREIGN PATENT DOCUMENTS

| | | | |
|---|---|---|---|
| EP | 2682408 | * | 1/2014 |
| JP | H07298777 A | | 11/1995 |

(Continued)

OTHER PUBLICATIONS

JPH07298777A Translation (Year: 1995).*
International Application No. PCT/AU2018/050329, International Search Report and Written Opinion, mailed May 7, 2018.

*Primary Examiner* — David J Parsley
(74) *Attorney, Agent, or Firm* — MARSHALL, GERSTEIN & BORUN LLP

(57)                ABSTRACT

The present invention relates to a method for producing a plant growth media, the method comprising subjecting a wet microbial cellulose material to a homogenisation process, thereby producing a pulp suitable as a plant growth medium. The present invention further relates to a plant growth medium produced from microbial cellulose material.

28 Claims, 16 Drawing Sheets

(56) References Cited

U.S. PATENT DOCUMENTS

| 9,139,861 B2* | 9/2015 | Nagaki | C12N 1/22 |
| 2018/0014476 A1* | 1/2018 | Shah | C09K 17/46 |
| 2019/0364751 A1* | 12/2019 | Reiersen | A01G 24/44 |

FOREIGN PATENT DOCUMENTS

| WO | WO-89/012107 A1 | 12/1989 |
| WO | WO-2015/145442 A2 | 10/2015 |

* cited by examiner 1.5 wt/wt%

2.0 wt/wt%
Manual Spread 1.0 wt/wt%

0.25 wt/wt%

0.1 wt/wt%

0.5 wt/wt%    2 Minutes 0.5 wt/wt%    5 Minutes 0.75 wt/wt%

0.5 wt/wt%    3 Minutes 1.5 wt/wt%

2.0 wt/wt%

1.0 wt/wt%

0.25 wt/wt%
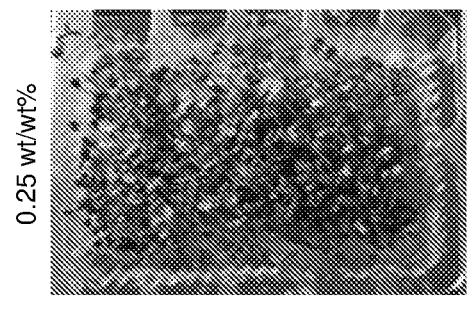
Figure 5(b)
0.5 wt/wt%    2 Minutes
Figure 5(c)
0.1 wt/wt%
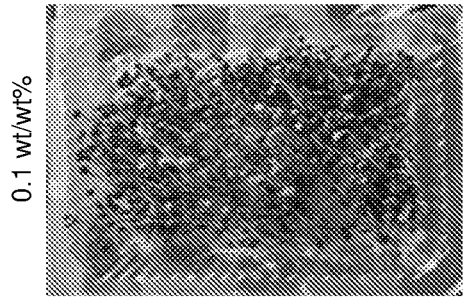
Figure 5(a)

1.5 wt/wt%

2.0 wt/wt%

1.0 wt/wt%

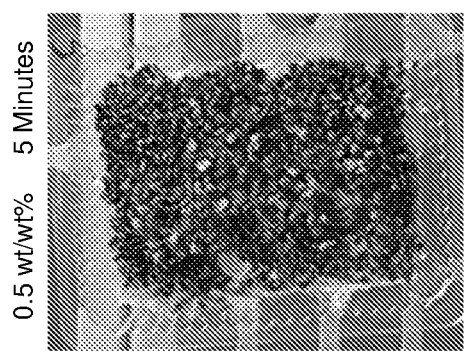
0.5 wt/wt%    5 Minutes
Figure 6(e)
0.75 wt/wt%
Figure 6(f)
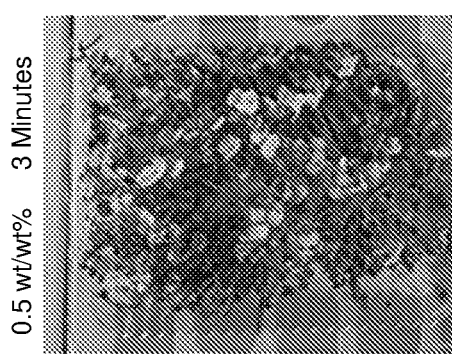
0.5 wt/wt%    3 Minutes
Figure 6(d)

1.5 wt/wt%

2.0 wt/wt%

1.0 wt/wt%

PLANT GROWTH MEDIA AND METHOD FOR MAKING SAME

This application is a US national stage of International Patent Application No. PCT/AU2018/050329, filed on Apr. 11, 2018, incorporated by reference, which claims priority benefit of Australia Patent Application No. 2017901318, filed Apr. 11, 2017.

TECHNICAL FIELD

The present invention relates to a plant growth medium and a method for producing plant growth media. More specifically, the present invention provides a method for processing microbial cellulose to produce a plant growth media and a plant growth medium derived from microbial cellulose.

BACKGROUND ART

The following discussion of the background art is intended to facilitate an understanding of the present invention only. The discussion is not an acknowledgement or admission that any of the material referred to is or was part of the common general knowledge as at the priority date of the application.

Soilless media for seed germination and plant growth are becoming increasing popular in horticulture due to their ability to control water and nutrient supply as well as the suppression of soil-borne diseases. Unfortunately, most of these substrates are synthetic and/or non-biodegradable which represents a problem for replanting and disposal, or when used for edible plants.

Whilst the use of non-synthetic substrates is known, these have been primarily limited to plant-based cellulose materials. However, whilst the water retention capacities of such materials compare favourably to some other types of substrates, they must still be watered frequently, if not continuously.

Microbial cellulose is an organic compound produced by certain types of bacteria. Whilst microbial cellulose has the same molecular formula as plant cellulose, it has significantly different macromolecular properties and characteristics. One of these characteristics that makes it attractive as a plant growth substrate is its high water retention capacity. However, despite the favorable water retention capacity, the structure of microbial cellulose is too dense to allow for root penetration.

Throughout this specification, unless the context requires otherwise, the word "comprise" or variations such as "comprises" or "comprising", will be understood to imply the inclusion of a stated integer or group of integers but not the exclusion of any other integer or group of integers.

The invention described herein may include one or more range of values (e.g. size, displacement and field strength etc). A range of values will be understood to include all values within the range, including the values defining the range, and values adjacent to the range which lead to the same or substantially the same outcome as the values immediately adjacent to that value which define the boundary to the range.

SUMMARY OF INVENTION

In accordance with the present invention, there is provided a method for producing a plant growth medium, the method comprising:

subjecting a wet microbial cellulose material to a homogenisation process, thereby producing a pulp suitable as a plant growth media.

Throughout this specification, unless the context requires otherwise, the term "suitable as a plant growth medium" or variations thereof, will be understood to refer to a medium which may be used to substitute soil as a support for plant growth. Such media provide a substance in which seeds may germinate and provides a support for a plant's root system.

Throughout this specification, unless the context requires otherwise, the term "wet microbial cellulose" or variations thereof, will be understood to refer to a microbial cellulose material that has a water content.

In one form of the present invention, the microbial cellulose material is produced by a bacterium species selected from the group comprising *Sarcina* sp., *Agrobacterium* sp. and *Acetobacter* sp.

As would be understood by a person skilled in the art, microbial cellulose is an organic polymer of β-1,4-D-glucose sub-units produced by bacteria. Advantageously, microbial cellulose is organic and fully biodegradable.

Throughout this specification, unless the context requires otherwise, the term "homogenisation process" or variations thereof, will be understood to refer to a process that decreases the particle size of least one fraction of a mixture containing at least two discrete fractions. In the context of the present invention, the homogenisation process reduces the average particle size of the microbial cellulose. The homogenising process does not necessarily result in a fully homogenous mixture.

The wet microbial cellulose is produced by the bacteria as a three-dimensional matrix of microbial cellulose fibrils. This matrix forms as a dense mat, resulting in a gelatinous membrane-like morphology. Whilst seed germination on unprocessed wet microbial cellulose is possible, the inventors have determined that following germination, the roots are unable to penetrate the dense network of fibrils. The roots are therefore unable to take full advantage of water held within the microbial cellulose structure. The inventors have discovered that reducing the particle size of the microbial cellulose allows for penetration of plant roots, while retaining water retention properties required for suitability as a plant growth medium. Without wishing to be bound by theory, it is understood that the particle size reduction of the present invention at least partially break up the dense three-dimensional matrix of microbial cellulose fibrils. Advantageously, unlike the dense network of the unprocessed microbial cellulose, the roots of the plant seed are able to penetrate the pulp and gain the structural support of a properly developing root system. It has been found that subjecting the wet microbial cellulose to a homogenising process reduces the particle size of the microbial cellulose within a particular narrow range. It is understood by the inventors that this reduction in particle size has been found to allow the microbial cellulose pulp to be suitable as a plant growth media.

Preferably, the homogenisation process is selected from any one of mechanical, pressure homogenisation processes or a combination thereof. More preferably, the homogenisation process is a mechanical homogenisation process.

As would be understood by a person skilled in the art, mechanical homogenisation processes deform and/or break the wet microbial cellulose under a stress applied by a mechanical force. The mechanical force may be selected from one or more of a tensile stress, bending stress, compressive stress, torsional stress, impact stress and shearing stress. Preferably, the mechanical force is any one or more of compressive stress, impact stress and shearing stress.

As would be understood by a person skilled in the art, pressure homogenisation processes force a stream of the wet microbial cellulose through a system which subjects it to any one of a number of forces which are intended to reduce the particle size of any components within it. Typically, the sample is forced through a valve or membrane with very narrow slits. In practice, depending on the setup of a particular system, a high pressure homogenizer could operate on any combination of shear forces, impact, and cavitation.

The inventors have found that mechanical homogenisation using high speed rotating blades is particularly useful in homogenisation of the microbial cellulose. In such processing, it is understood that the mechanical force primarily consists of the impact force generated from the collision between the rotating blades and the microbial cellulose and of the shearing force generated due to differences of the speed in the medium.

In one form of the present invention, the homogenisation process is performed in a homogenisation apparatus. As would be understood by a person skilled in the art, any apparatus that is capable of applying the mechanical force to the microbial cellulose will be suitable. Preferably, the apparatus is a blender.

As would be understood by a person skilled in the art, particle size distributions are often measured by laser diffraction analysis, and expressed using D values. The meanings of the respective D values, are:

D10: size under which 10% by volume of the particles are below;

D50: size under which 50% by volume of the particles are below; and

D90: size under which 90% by volume of the particles are below.

Throughout this specification, references to particle size distribution characteristics refer to characteristics measured by laser diffraction analysis.

Preferably, the particle size distribution of the pulp is such that the D90 is between 750 and 1500 μm. More preferably, the D90 is between 1000 and 1400 μm.

Preferably, the particle size distribution of the pulp is such that the D50 is between 330 and 800 μm. More preferably, the D50 is between 400 and 700 μm. Still preferably, the D50 is between 500 and 650 μm.

Preferably, the particle size distribution of the pulp is such that the D10 is between 40 and 150 μm. More preferably, the D10 is between 60 and 120 μm. Still preferably, the D10 is between 80 and 105 μm.

In one form of the present invention, the D10 is at least 40 μm and the D90 is below 1500 μm. Preferably, the D10 is at least 60 μm and D90 is below 1400 μm. More preferably, the D10 is at least 80 μm and the D90 is below 1300 μm. Still preferably, the D10 is at least 100 μm and the D90 is below 1200 μm.

In a preferred form of the method of the present invention, prior to the step of subjecting a wet microbial cellulose material to a homogenisation process, the method of the present invention comprises the step of:

separating microbial cellulose from a growth media to produce wet microbial cellulose.

In an alternate form of the method of the present invention, prior to the step of subjecting a wet microbial cellulose material to a homogenisation process, the method of the present invention comprises the step of:

applying an aqueous solution to dry microbial cellulose to produce the wet microbial cellulose.

Advantageously, the inventors have determined that the applicability of the method of the present invention to reconstituted dry microbial cellulose allows for the cost effective transport of the dried microbial cellulose from locations where it is produced to locations where it can be further processed by the method of the present invention. It is understood by the inventors that when the microbial cellulose is dried, the structure of the matrix is deformed and there can be difficulties in reconstituting the microbial cellulose to original extent. It is therefore preferably to use wet microbial cellulose that is separated from the growth media. Furthermore, it is preferable that the pulp is not allowed to dry out.

In one form of the present invention, the dry microbial cellulose may be subjected to a size reduction step prior to the application of an aqueous solution to produce the wet microbial cellulose.

In one form of the present invention, the method further comprises the step of controlling the water content of the wet microbial cellulose. Preferably, the step of controlling the water content of the pulp more specifically comprises watering or de-watering the wet microbial cellulose.

In one form of the present invention, the concentration of the microbial cellulose is in the wet microbial cellulose between 0.1 and 2.5 wt/wt %. As would be understood by a person skilled in the art, wt/wt % refers to the percentage of the weight of the microbial cellulose for 100 g of pulp. For example, 10 wt/wt % would refer to 10 g of microbial cellulose made up to 100 g with water.

As would be appreciated by a person skilled in the art, the less water in the wet microbial cellulose, the thicker the wet microbial cellulose is. It has been found by the inventors that as the concentration of the wet microbial cellulose approaches 2.5 wt/wt %, the wet microbial cellulose becomes too thick to effectively perform the homogenisation process to produce pulp suitable a plant growth medium.

Preferably, the concentration of the microbial cellulose is between 0.2 and 2.0 wt/wt %. More preferably, the concentration of the microbial cellulose is between 0.2 and 1.5 wt/wt %. Still preferably, the concentration of the microbial cellulose is between 0.5 and 1.2 wt/wt %. Still preferably, the concentration of the microbial cellulose is between 0.5 and 1.0 wt/wt %. Still preferably, the concentration of the microbial cellulose is between 0.6 and 0.9 wt/wt %. Still preferably, the concentration of the microbial cellulose is between 0.7 and 0.8 wt/wt %.

Where the concentration of the microbial cellulose is between 0.1 and 1.0 wt/wt %, the D10, D50 and D90 are measured by laser diffraction analysis.

Where the concentration of the microbial cellulose is between 1.0 and 2.5 wt/wt %, the D10, D50 and D90 are measured by a series of nested test sieves.

In one form of the present invention, the concentration of the pulp is less than 2.5 wt/vol %. As would be understood by a person skilled in the art, wt/vol % refers to the percentage of the weight of the microbial cellulose for 100 ml of pulp. For example, 10 wt/vol % would refer to 10 g of microbial cellulose in a pulp of 100 ml.

In one form of the present invention, the density of the pulp is less than 0.025 g/cm³. As would be understood by a person skilled in the art, density refers to the weight of the pulp per cubic centimetre of pulp.

In one form of the present invention, the viscosity of the pulp is between 0.0030 and 0.088 Pa·s. Preferably, the viscosity of the pulp is between 0.0030 and 0.065 Pa·s. More preferably, the viscosity of the pulp is between 0.0035 and 0.0275 Pa·s. Still preferably, the viscosity of the pulp is between 0.006 and 0.0275 Pa·s. Still preferably, the viscosity of the pulp is between 0.008 and 0.0275 Pa·s. Still preferably, the viscosity of the pulp is between 0.01 and 0.018 Pa·s.

As described above, the homogenising process of the present invention will produce a pulp that is suitable for use as a plant growth media. Without wishing to be bound by theory, the inventors understand that both the concentration of microbial cellulose in the pulp and the particle size of the microbial cellulose directly impact the suitability of the pulp as a plant growth media. As discussed above, the densely packed fibres of the non-homogenised wet microbial cellulose do not allow for the penetration of the roots. The homogenisation process is understood to reduce the particle size of the microbial cellulose, disrupting the fibre packing and allowing root penetration. The inventors have determined that should either the wt/wt % concentration of microbial cellulose in the pulp and/or its particle size be reduced too much, the pulp would be unable to support the weight of the weight of the developing seedling or sprout. Further, the water retention ability of the pulp is reduced, which is unfavourable for plant growth.

In one form of the present invention, prior to the step of subjecting a wet microbial cellulose material to a homogenisation process, the method comprises the step of:

washing the wet microbial cellulose.

In a preferred form of the invention, the step of washing the wet microbial cellulose comprises heating the wet microbial cellulose in water at a temperature between 60° C. and 100° C.

More preferably, the step of washing the wet microbial cellulose comprised boiling the wet microbial cellulose in water.

In one form of the present invention, prior to the step of subjecting a wet microbial cellulose material to a homogenisation process, the method comprises the step of:

purifying the wet microbial cellulose.

In a preferred form of the invention, the step of purifying the wet microbial cellulose comprises boiling the wet microbial cellulose in water.

In one form of the present invention, the pulp is pourable.

In accordance with a further aspect of the present invention, there is provided a plant growth media as prepared by the above discussed method.

In accordance with a further aspect of the present invention, there is provided a plant growth medium, the plant growth medium comprising a pulp of microbial cellulose, wherein the pulp comprises between 0.1 and 2.5 wt/wt % microbial cellulose and the particle size distribution of the pulp is such that the D90 is between 750 and 1500 μm.

Preferably, the concentration of the microbial cellulose is between 0.2 and 2.0 wt/wt %. More preferably, the concentration of the microbial cellulose is between 0.2 and 1.5 wt/wt %. Still preferably, the concentration of the microbial cellulose is between 0.5 and 1.2 wt/wt %. Still preferably, the concentration of the microbial cellulose is between 0.5 and 1.0 wt/wt %. Still preferably, the concentration of the microbial cellulose is between 0.6 and 0.9 wt/wt %. Still preferably, the concentration of the microbial cellulose is between 0.7 and 0.8 wt/wt %.

Preferably, the D90 is between 1000 and 1400 μm.

Preferably, the particle size distribution of the pulp is such that the D50 is between 330 and 800 μm. More preferably, the D50 is between 400 and 700 μm. Still preferably, the D50 is between 500 and 650 μm.

Preferably, the particle size distribution of the pulp is such that the D10 is between 40 and 150 μm. More preferably, the D10 is between 60 and 120 μm. Still preferably, the D10 is between 80 and 105 μm.

In one form of the present invention, the D10 is at least 40 μm and the D90 is below 1500 μm. Preferably, the D10 is at least 60 μm and D90 is below 1400 μm. More preferably, the D10 is at least 80 μm and the D90 is below 1300 μm. Still preferably, the D10 is at least 100 μm and the D90 is below 1200 μm.

In accordance with a further aspect of the present invention, there is provided a plant growth medium, the plant growth medium comprising a pulp of microbial cellulose, wherein the pulp comprises less than 2.5 wt/vol % microbial cellulose and the particle size distribution of the pulp is such that the D90 is between 750 and 1500 μm.

In accordance with a further aspect of the present invention, there is provided a plant growth medium, the plant growth medium comprising a pulp of microbial cellulose, wherein the pulp density is less than 0.025 g/cm³ and the particle size distribution of the pulp is such that the D90 is between 750 and 1500 μm.

In one form of the present invention, the bulk density of the pulp is between 0.005 and 0.015 g/cm³. Preferably, the bulk density of the pulp is between 0.006 and 0.010 g/cm³. Preferably, the bulk density of the pulp is between 0.007 and 0.009 g/cm³. As would be understood by person skilled in the art, the bulk density of material in this context refers to the dry weight of the microbial cellulose per unit of volume of the pulp. The total volume is the combined volume of solids and water content. The bulk density is therefore indicative of the water holding capacity of the pulp per unit of dry material.

As discussed above, the homogenization process of the present invention disrupts the dense network of fibres of the microbial cellulose, allows for increase dispersion of the aqueous phase therethrough. As would be appreciated by a person skilled in the art, the bulk density of wet microbial cellulose prior to undergoing the homogenization process is between 0.025-0.045 g/cm³. This demonstrates that the increase water holding of capacity of the pulp compared to the unprocessed microbial cellulose. The increase capacity to hold water is particularly advantageously for supporting plant growth. Additionally, the bulk density of the plant growth substrate of the present invention is much lower than that of commercially available soilless substrates such as potting mixes, which has a bulk density between 0.25-0.75 g/cm³. The bulk density of vermiculite is between 0.7-1.1 g/cm³. The low bulk density for the plant growth media of the present invention shows its very high capacity to hold water. The very low bulk density also indicates that it is lightweight for cheap and ease of transport. Transport costs of many seed germination and plant growth media are prohibitive.

Throughout this specification, unless the context requires otherwise, the term "field capacity" or variations thereof, will be understood to refer the amount of water that remains in the soil/media after excess water has been allowed to drain, by gravity only, for a period of time until no more water drains.

In one form of the present invention, the gravimetric water capacity (θg) of the pulp at field capacity is between 71.6-76.5g H₂O/g dry microbial cellulose (7405%). This compares to a sandy soil that has a θg of ~0.03 g/g (3%) and clay soils having a θg of ~0.4 g/g (40%). This high θg means that the plant growth media of the present invention holds a significant amount of water and/or nutrient solution that is available for seed germination and plant growth.

In one form of the present invention, the plant growth media is edible. Advantageously, the inventors have found that the plant growth media is safe for human consumption. As would be understood by a person skilled in the art, most soils and soil substitutes are not safe for human consumption. Furthermore, soil borne pathogens also present a health risk. In order to address these problems, any foodstuffs grown in soils or typical soil substitutes needs to undergo a strict washing process. The inventors have found that foodstuffs grown in the pulp of the present invention do not require such a washing process to be safe for human consumption.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which:

FIGS. 5(a)-(i) are a set of photographs showing the differences in plant growth on the plant growth substrates of FIG. 3 after 95 hours;

DESCRIPTION OF EMBODIMENTS

Figure 1B:
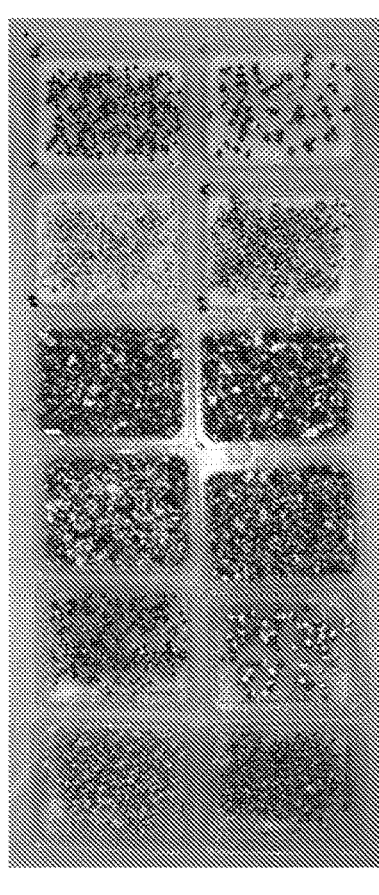
FIG. 1 is a set of photographs showing the comparison of growth of various plants on the plant growth media of the present invention compared to other plant growth media.
Figure 1D:
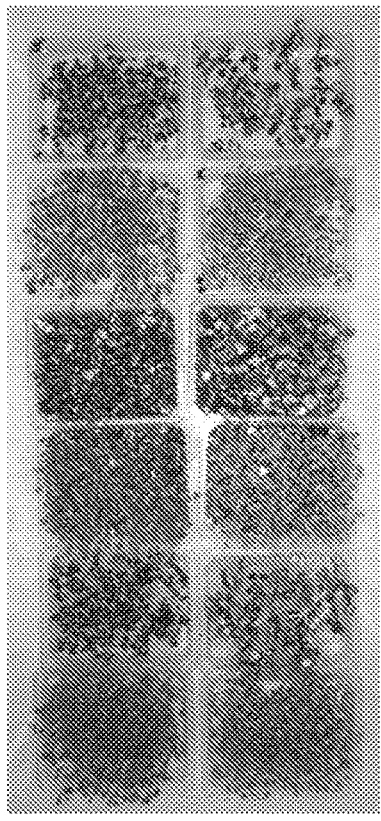
Figure 1A:
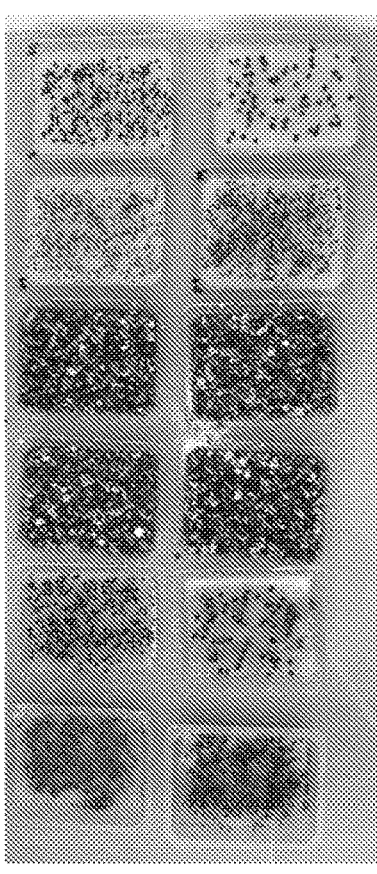
Figure 1C:
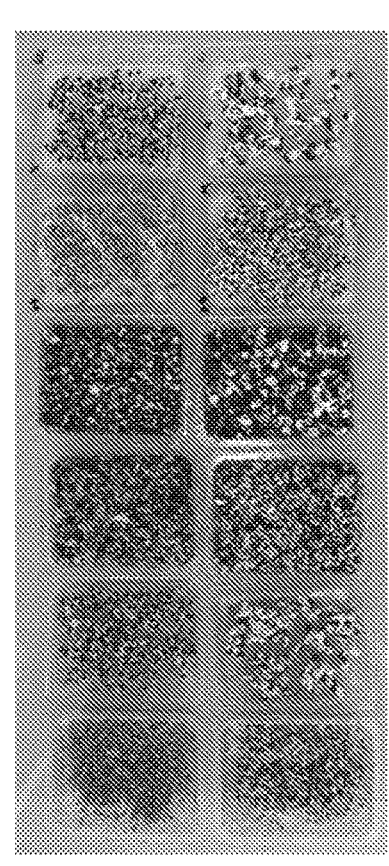
Figure 1F:
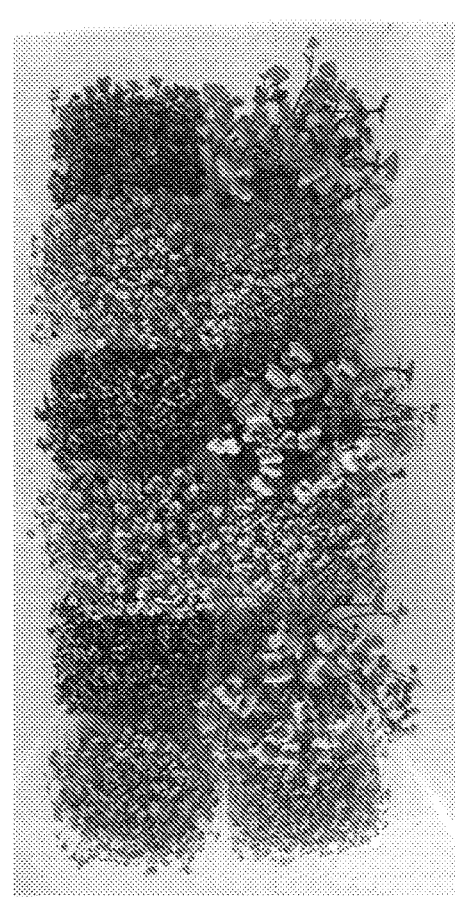
Figure 1G:
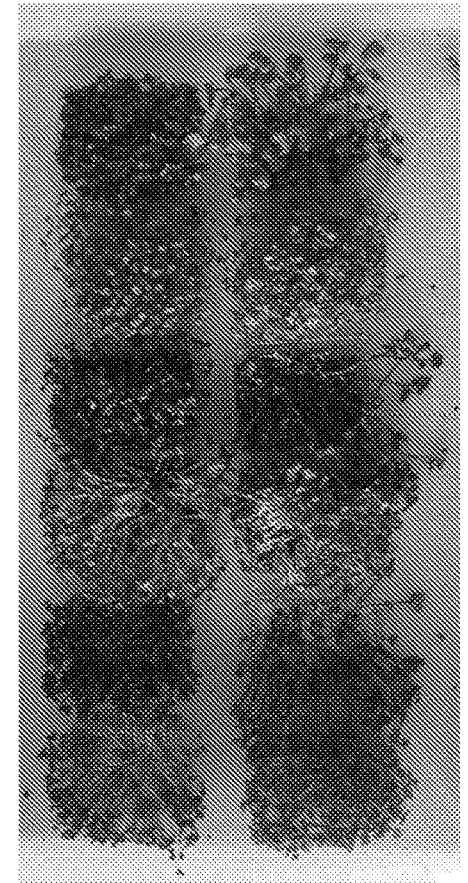
Figure 1E:
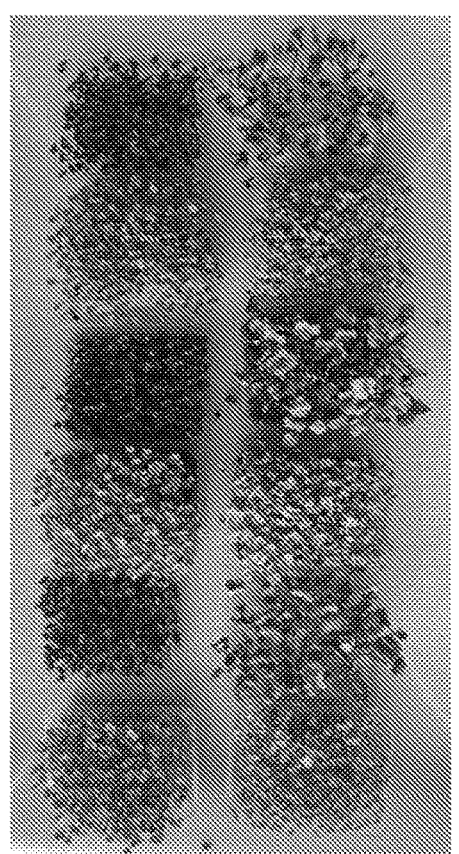

The present invention relates to the production of a pulp suitable as a plant growth medium. In its broadest form, the method of the present invention comprises subjecting a wet microbial cellulose material to a homogenisation process, thereby producing a pulp suitable as a plant growth media.

Preparation of Wet Microbial Cellulose

*Acetobacter xylinum* strain can be obtained naturally by leaving wine exposed to air. After a few weeks, the indication that the wine had been inoculated by *A. xylinum*, was the development of a solid pellicle of microbial cellulose on the surface of the wine. This microbial cellulose pellicle, generally grown in a 600 ml beakers or similar sized containers, was further used as the starter culture for the preparation of larger cultures. To minimize contamination of the starter cultures by other microorganisms, the container was sealed with a piece of porous paper towel secured to the top of the container with a rubber band. This allowed the starter culture to breathe.

Several pieces of the microbial cellulose pellicle (that contain *A. xylinum*) was removed from the starter cultures and placed into larger containers appropriately sized for the amount of microbial cellulose required. These larger plastic containers ranged from 5 L-20 L in size. Wine that was used as the liquid culture media was prepared by diluting, with water, to ⅔rd its original concentration. This brought the alcohol content of the wine down to approximately 7-8%. A thin layer of the diluted wine was poured into the larger containers, ensuring that microbial cellulose pellicles were covered. The lid was placed onto the container making sure that it was not airtight and the cultures could breathe. After 1-2 weeks, depending on the temperature the cultures were exposed to, a newly formed microbial cellulose pellicle was removed for further processing.

Once the microbial cellulose pellicle was removed, more of the diluted wine was added to the cultures to allow more microbial cellulose to form, giving a continuous culture.

The wet microbial cellulose pellicle is dried to less than 5% moisture content.

The microbial cellulose can also be obtained in the form of dried Nata de Coco (produced using Acetobacter xylinum in coconut water).

Washing and Purifying the Wet Microbial Cellulose

In a preferred form of the invention, the step of washing the wet microbial cellulose comprises boiling 30-40 grams of dry microbial cellulose for 30 minutes in 3-4 litres of water containing 10-15 g of detergent. One detergent used that showed good results was "Biozet Attack plus softener", which contains anionic and non-ionic surfactants, sodium aluminosilicate, sodium carbonate, sodium silicate, soil suspending agent, fluorescers, antifoam, enzymes, and perfume. Enzymes are protease, lipase, amylase. Following this is further washing in boiling water (2×3-4 litres for 15 minutes each) and tepid water (2×3-4 litres for 15 minutes each).

In an embodiment of the present invention, microbial cellulose pellicles removed from the culture vessels were boiled in a detergent solution to remove the colour and other impurities. After several boiling water changes the now white microbial cellulose sheets where placed in a Waring® laboratory blender and macerated for 3 minutes at maximum speed, adding water to the final concentration. The resulting pulp has a fine fibrous consistency. The final concentration was 0.75 wt/wt % with an average viscosity of 0.013 Pa·s As a pouring solution, the plant growth media can be molded into any shape and even sprayed on soil surfaces for remediation. If plant seeds are mixed into the pouring solution, this novel seeded microbial cellulose solution would be ideal to spray onto disturbed landscapes as a method of stabilized the soil surface whilst initiating and maintaining seed germination and plant growth.

Set Plant Growth Media

The plant growth media pouring solution described above can be poured into a container with drain holes, sized at 2 mm diameter, in the bottom. The pouring solution is allowed to free drain, until no more water freely drains from the pouring solution. The pouring solution is now at field capacity (FC) and is termed the plant growth media.

The pulp is now capable of accommodating seed germination and maintaining plant growth

EXAMPLE 1

A series of growth tests were performed to compare the plant growth media of the present invention against other growth substrates. Substrates tested were:

Plant Growth Media (as prepared above).

Biostrate® Matting—fibrous matting made from maize used for seed germination.

Vermiculite—hydrous phyllosilicate clay mineral

Four trays with the following plant specifies were prepared on each substrate:

*Eruca Sativa* (Rocket)

*Brassica oleracea* (Red Cabbage)

*Raphanus raphanistrum* (Pink Stem Radish)

*Brassica juncea* (Mizuna).

The physical condition of the tests were as follows:

Temperature range: Max. 20-28° C./Min. 12-16° C.

Lighting: 75% shade cloth

Trays were covered with plastic wrap for first two days, watered via spray bottle to run off, twice per day. Cover removed on day three to allow the plants to grow in full sunlight.

From day three onwards, each sample was watered three times per day using a spray bottle to run off.

FIGS. 1(*a*)-1(*g*) shows the progress of the growth of each variety on the three different substrates across 7 days. Each image shows (from right to left): Four trays of Biostrate® Matting; Four trays of vermiculite; and Four trays of the plant growth media. Each series of four trays in planted with (as clockwise from top left): Eruca sativa (rocket); Brassica oleracea (red cabbage); Raphanus raphanistrum (pink stem radish); and Brassica juncea (Mizuna).

Height Comparison After 5 Days

| Variety | Substrate | Height (mm)* |
|---|---|---|
| Pink Stemmed Radish | Plant Growth Media | 30-40 |
|  | Vermiculite | 35-50 |
|  | Matting | 35-45 |

-continued

| Variety | Substrate | Height (mm)* |
|---|---|---|
| Mizuna | Plant Growth Media | 30-45 |
|  | Vermiculite | 40-45 |
|  | Matting | 30-40 |
| Rocket | Plant Growth Media | 25-45 |
|  | Vermiculite | 35-50 |
|  | Matting | 35-45 |
| Red Cabbage | Plant Growth Media | 20-25 |
|  | Vermiculite | 30-35 |
|  | Matting | 25-30 |

*These heights describe the average height of seedlings in each treatment, measured from the top of growth media to top leaf After 7 days, the samples remained in full sunlight, but watering was ceased. The four micro herbs growing on plant growth media did not wilt and were able to maintain structural integrity compared to the four micro herbs growing on the matting and vermiculite.

FIG. 1 shows a series of photos taken of the samples over the seven day testing period.

As can be seen from the results of the above table, the plant growth media of the present invention is just as suitable for seed germination as other soilless substrates. Advantageously, the plant growth media of the present invention has a much higher water retention rate than the other substrates, preventing wilting once the watering ceased.

A further advantage of the present invention is that as the plant growth media is fully organic, it does not have to be removed from the seedlings when planting out. This means that the roots do not have to be damaged in order to remove the plant growth substrate. As would be understood by a person skilled in the art, synthetic plant substrates must be fully removed before planting out or before using the plant as a food. As the roots grow through the synthetic material, they often must be broken before planting out.

EXAMPLE 2

Figure 2:
FIG. 2 shows microscopic images of attempts at bacteria growth on the plant growth media of the present invention.
Figure 2:
Figure 3B:
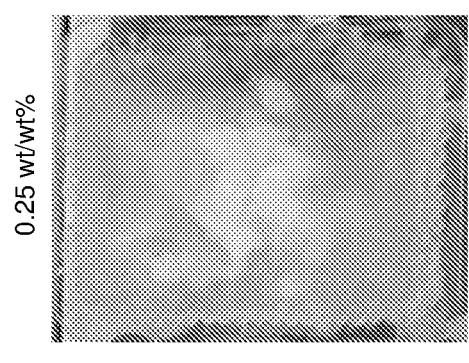
FIGS. 3(a)-(i) are a set of photographs showing the differences in plant growth substrates of varying pulp concentrations as prepared in Example 3.
Figure 3C:
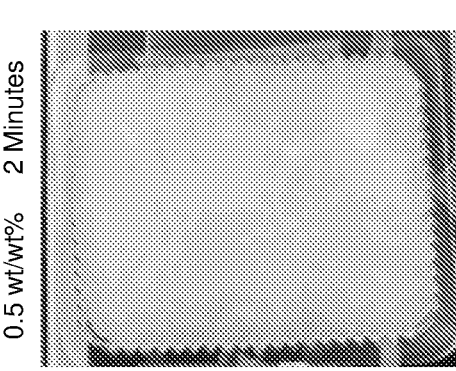
Figure 3A:
Figure 3E:
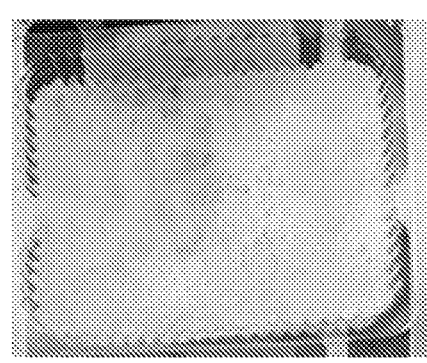
Figure 3F:
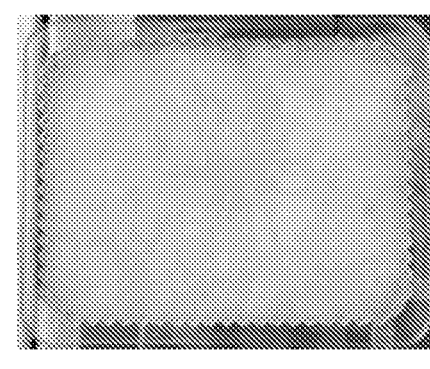
Figure 3D:
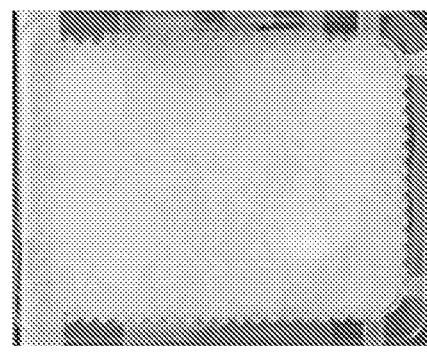
Figure 3H:
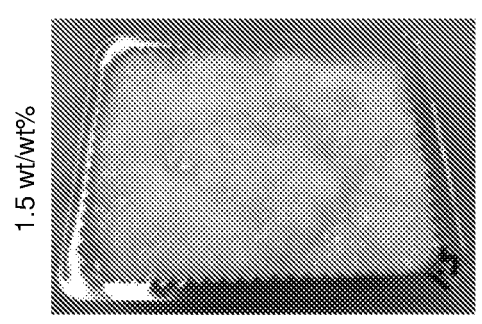
Figure 3I:
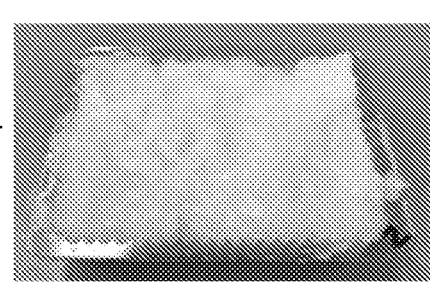
Figure 3G:
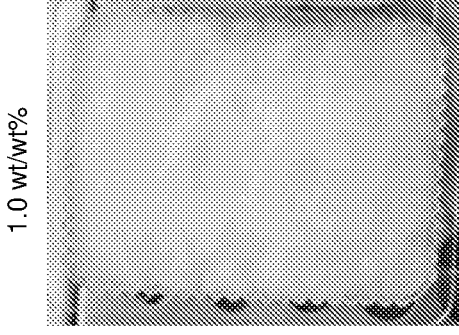
Figure 4B:
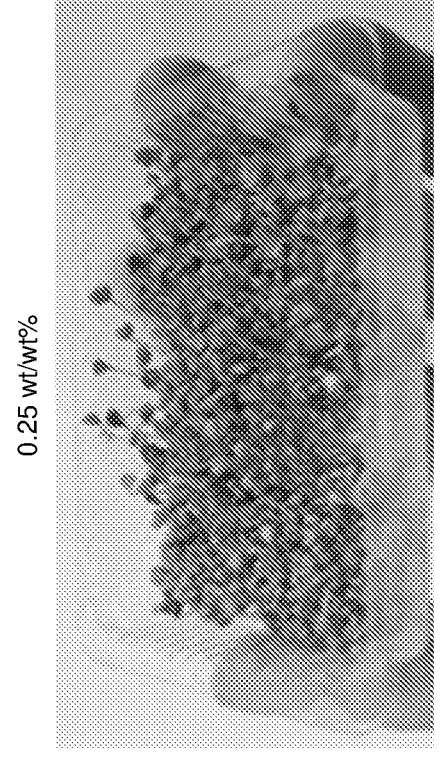
FIGS. 4(a)-(i) are a set of photographs showing the differences in plant growth on the plant growth substrates of FIG. 3 after 63 hours.
Figure 4A:
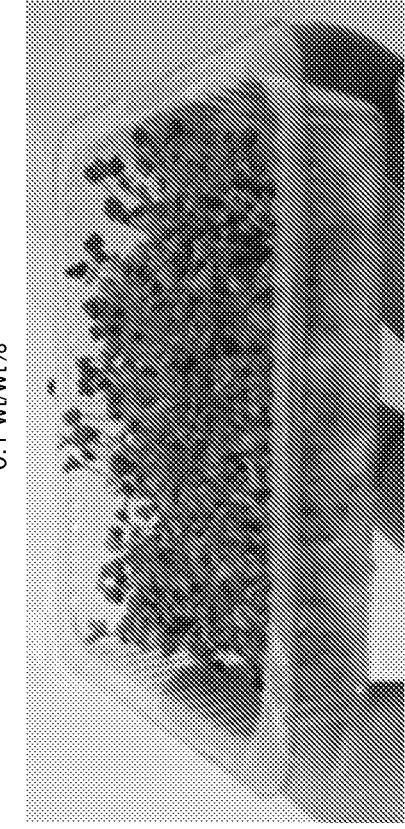
Figure 4C:
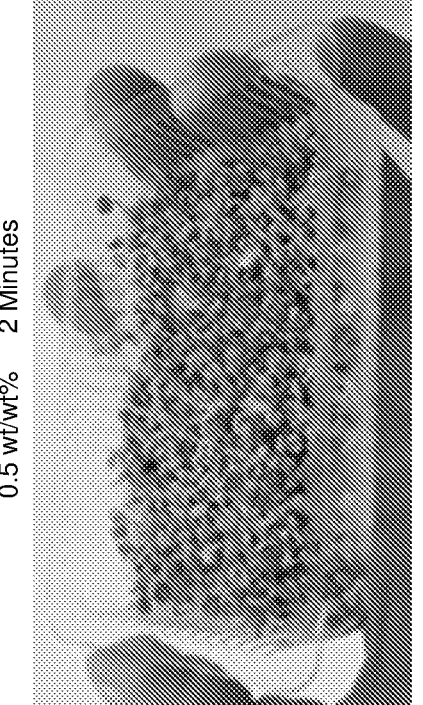
Figure 4E:
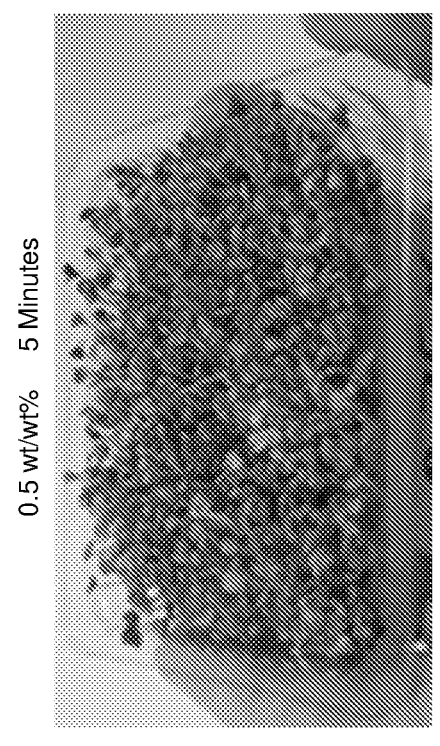
Figure 4F:
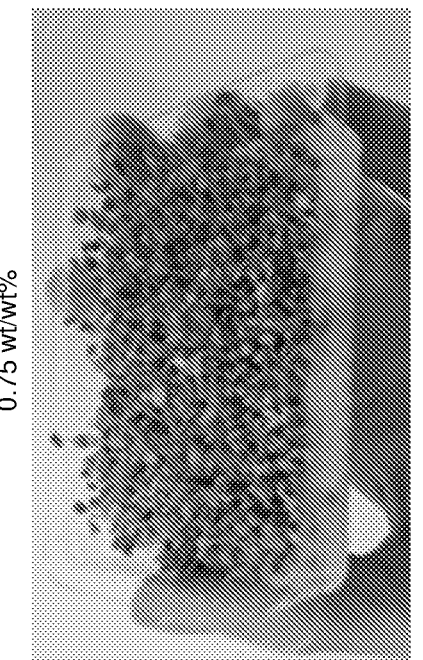
Figure 4D:
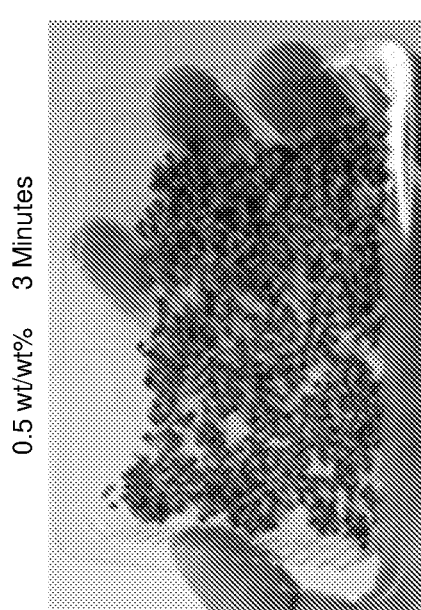
Figure 4H:
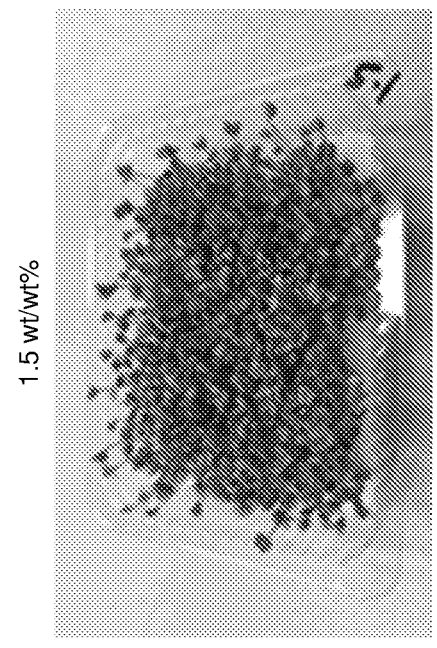
Figure 4I:
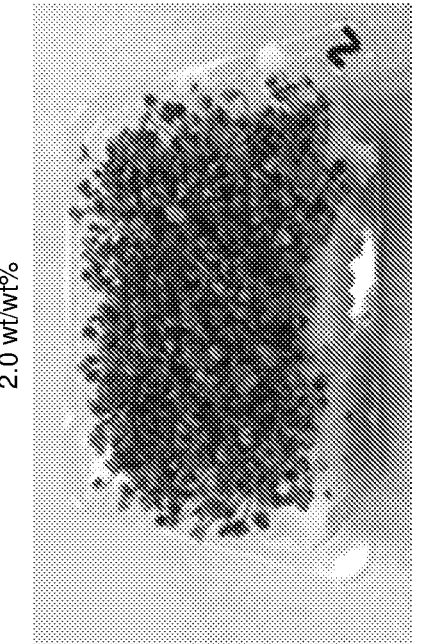
Figure 4G:
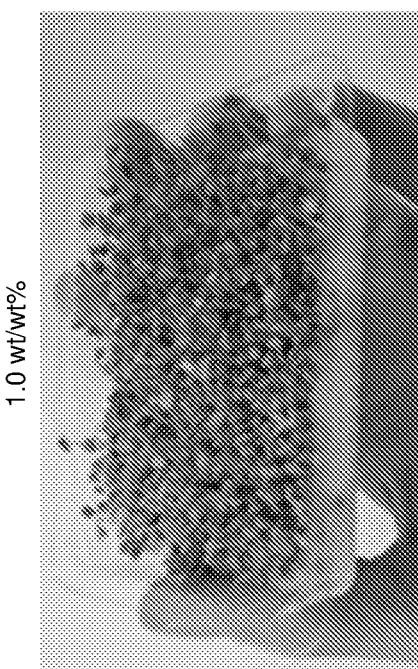
Figure 5E:
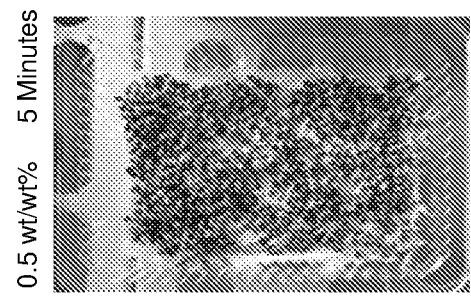
Figure 5F:
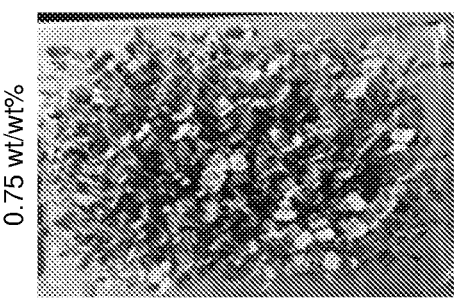
Figure 5D:
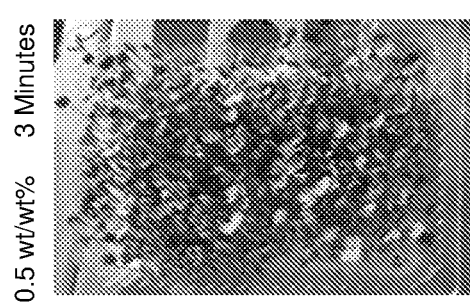
Figure 5H:
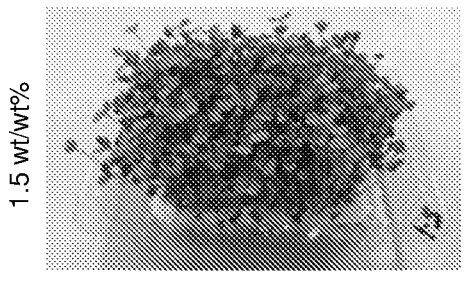
Figure 5I:
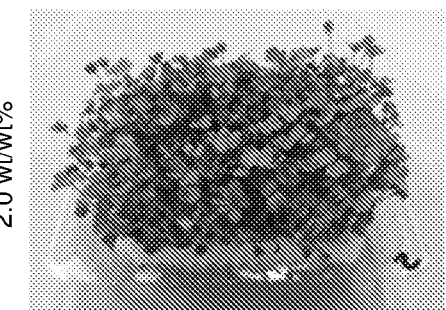
Figure 5G:
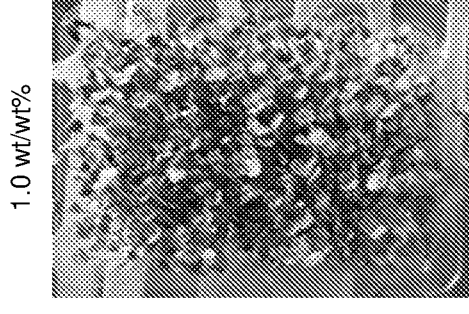
Figure 6B:
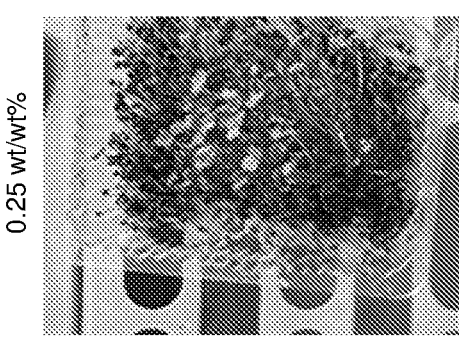
FIG. 6 (a)-(i) are a set of photographs showing the differences in plant growth on the plant growth substrates of FIG. 3 after 141 hours.
Figure 6C:
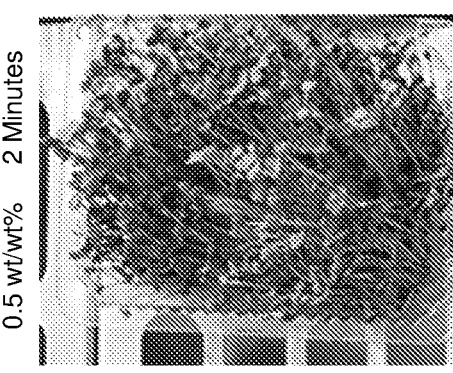
Figure 6A:
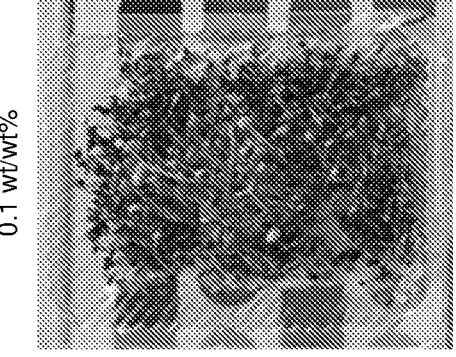
Figures 6G, 6H, 6I:
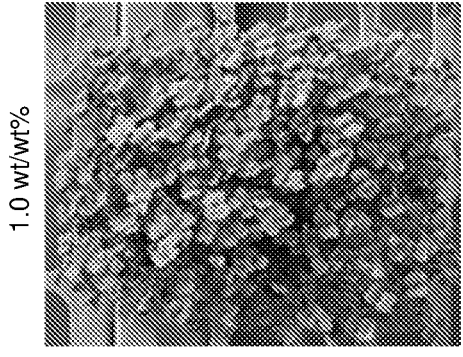

An analysis of fungal growth on the plant growth media of the present invention was undertaken. A preliminary test showed that *Penicillium* plugs did not grow onto the plant growth media. Microscopic images at day 3 are shown in FIG. 2. The microscope images showed *Penicillium* fruiting body on the green patches that didn't grow on the plant growth media.

EXAMPLE 3

A series of tests were undertaken to determine the effect that homogenization had on the particle size of pulps of different concentrations. A series of pulps of differing concentrations were each processed in a Waring® laboratory blender at maximum speed for a period of 2 minutes. A particles size analysis was then made on each sample. The results are shown below.

| Concentration (wt/wt %) | D10 | D50 | D90 | Weighted Residual (%) | Uniformity |
|---|---|---|---|---|---|
| 0.1 | 122.38 | 661.603 | 1388.774 | 0.5 | 0.588 |
| 0.25 | 130.558 | 686.282 | 1401.08 | 0.721 | 0.568 |
| 0.5 | 78.765 | 452.305 | 1201.31 | 0.624 | 0.775 |
| 0.75 | 101.471 | 607.611 | 1342.417 | 0.699 | 0.635 |
| 1 | 72.917 | 414.007 | 1225.797 | 0.598 | 0.862 |

As would be understood by a person skilled in the art, D10 states that 10% of the sample by volume have a particle size less than the number shown. Therefore D10=122.38 um means that 10% of the sample by volume has particle size of 122.38 micrometers or less. The nomenclature describing the particle size of compound is commonly referred to, and is herein, as either the "D90", "D50" or the "D10".

A D90 states that 90% of the sample by weight has a particle size less than the number shown. For example, a D90 of 40 (or D90=40) means that at least 90% of the sample by volume has a particle size of less than 40 microns Likewise, a D10 states that 10% of the sample by volume has a particle size less than the number shown.

The D50 value represents the median particle size. Median values are defined as the value where half of the sample by weight resides above this point, and half sample by volume resides below this point. The D50 is the size in microns that splits the distribution with half above and half below this diameter.

It has been found that by subjecting the wet microbial cellulose to a homogenising process, brings the particle size within a particular narrow range. This particular narrow range has been found to make the microbial cellulose pulp suitable as a plant growth media.

It is understood by those familiar with comminution process techniques that the limit set on the size of 90% or more of the particles is a feature to further distinguish the pulp of the present invention from unprocessed microbial cellulose exhibiting a broader size distribution. Because of the variation in size encountered in all matter reduced in size by a comminution process, expressing differences in particle size in the manner described herein is readily accepted by those skilled in the art.

The microbial cellulose particles in the pulp are irregular in shape. Therefore, it is necessary to characterize the particles by a measurement different from actual size, like thickness or length, for example, by measurement of a property, like intensity and angle of diffracted light, and equate that measurement to the diameter of known spherical particles having the measured same property. The particles are thus allocated an "equivalent spherical diameter." The values found from characterizing a large number of "unknown" particles can be plotted as volume vs. diameter, usually adopting percentage undersize values for volume. This provides a characteristic curve representing size distribution of the sample, cumulative percentage undersize distribution curve. Values can be read directly from the curve, or, alternatively, the measurements are plotted on log-probability paper to give a straight line, and the values can be read therefrom. The D90 equivalent spherical volume diameter thus found is a statistical representation of the 90% point on a cumulative frequency plot.

Particle Size Distribution was determined using the Mastersizer 2000 (Malvern, UK) laser diffractometer. The measurements were conducted using the dispersion unit 'Hydro 2000SM(A)'. The Hydro 2000SM is a wet sample dispersion unit which has a continuously variable single shaft pump and stirrer. In each measurement the amount of the sample pulp placed within the measurement system was such that the value of obscurance fell within the range of 10-20%. The speed of the pump and stirrer was selected so as to obtain maximum homogenization of the suspension. For pulps greater that 1.0 wt/wt % homogenization could not be achieved due to the thick gel nature of the sample and thus could not be measured. For all other samples that were measured the stirrer speed was set at 2000 r.p.m.

The intensity of the laser light registered on the particular detectors of the measurement system can be converted to particle size distribution according to the Mie Theory or the Fraunhofer theory. The choice of the theory is up to the performer of the measurements. The standard ISO 13320 recommends the application of the Mie Theory for particles smaller than 50 μm and for larger particles both theories provide similar results. The Fraunhofer model can predict the scattering pattern that is created when a solid, opaque disc of a known size is passed through a laser beam. However due to the sample nature very few particles are believed to be disc shaped and completely opaque and thus the Mie Theory was employed for measuring the particle size of the pulps. The Mie theory accurately predicts the light scattering behaviour of all materials under all conditions. The Mie Model predicts the way light is scattered through spherical particles and considers the way light passes through, or is absorbed by, the particle.

In light of the above, it is necessary to determine the values of the indices of absorption and refraction index of the sample. The refractive index was measured to be 1.33 (same as water, as the dispersion phase is water) and the absorption was assumed to be 0.01 (note that the absorption is usually based on the colour intensity of the sample. The lighter, more transparent the sample is observed, the lower the absorption value for example 0.0001).

The Mastersizer 2000 measures samples in triplicate and reports the values as an average.

As can be seen in the above table, the lower the concentration of the pulp the larger the D90 particle distribution.

The viscosity of each of the samples was also taken following the 2 minute homogenization process. These are shown below.

| Concentration (wt/wt %) | Average Viscosity (Pa. s.) |
|---|---|
| 0.1 | 0.0035 |
| 0.25 | 0.006 |
| 0.5 | 0.008 |
| 0.75 | 0.013 |
| 1 | 0.0275 |
| 2 | 0.065 |
| 3 | 0.088 |

The dynamic viscosity is measured in Pascal seconds (Pa·s) which are the SI units. These are related to cPs (centipoise) which are non standard but also used. The measurements were made in a Bohlin Visco 88 viscometer. The viscometer is a constant speed motor with a torque detection system. The sample to be tested is placed in the gap between upper and lower measuring systems. The instrument uses a controlled shear rate. That is, it applies a shear rate (rotational speed) and measures the resultant shear stress (torque) needed to maintain the shear rate. Torque and movement are converted into "rheological format" using a set of measuring system constants.

The calculated shear rate, shear stress and viscosity are based on Newtonian liquid properties. When non-Newtonian liquids are studied it is possible to calculate the true shear rate, etc. by using the rotational speed and torque readings. The measuring system constants used to convert the rotational speed and torque to shear rate and stress are based on Newtonian liquids. The sample is placed between two measuring systems in a up and bob arrangement. This consists of a solid inner cylinder with a conical base rotating inside an outer cylinder with the sample placed between the two. The rotational speed of the viscometer was 572 rpm and Measuring Combination System 2 was used. In this orientation the inner cylinder diameter is 25 mm and the outer cylinder diameter is 27.5 mm.

As can be seen form the above table, the viscosity increases as the sample concentration is increased. Wet microbial cellulose has a viscosity of approximately 0.12 to 0.13 Pa·s. This is much higher than the viscosity of the pulp produced after the homogenization process. The inventors believe that this demonstrates that the effect that the homogenization process has on the dense packing of the fibrous network of the unprocessed wet microbial cellulose.

A series of tests were undertaken to determine the effect that varying degrees of homogenization had on the particle size. The results are shown below.

| Blending Time | Concentration (wt/wt %) | D10 | D50 | D90 | Weighted Residual (%) | Uniformity |
|---|---|---|---|---|---|---|
| 2 | 0.5 | 78.765 | 452.305 | 1201.31 | 0.624 | 0.775 |
| 3 | 0.5 | 78.257 | 448.725 | 1196.37 | 0.754 | 0.777 |
| 5 | 0.5 | 42.658 | 215.582 | 770.989 | 0.5 | 1.07 |

As can be seen from the above results, the increased blending time significantly reduced the size of the particles.

EXAMPLE 4

Microbial cellulose pulps of concentrations above 1.0 wt/wt % were not measured using the Mastersizer 2000 as the pulps were too thick to be passed through the instrument. It would be understood by person skilled in the art that this problem may be overcome by using a dispersion unit in order to more evenly disperse the sample before being introduced into the instrument. However, the inventors have found that the pulps of the present invention do not disperse evenly due to the ability for the particles to agglomerate. As such, if the particle size was measured through laser diffraction techniques, the measurement would not reflect a true result.

In order to measure the particle size distributions of pulps with a concentration above 1.0 wt/wt %, the inventors used a sieve measurement technique. The sieve measurement technique involves using a series of nested test sieves (Endecotts Ltd) that decrease in size from 4.75 mm, 2 mm, 1 mm, 500 um and 250 μm. The pulp samples were passed through these sieves using a gentle flow of water to move the particles through the sieves. The weight of the particles remaining in the sieve fraction was calculated as a percentage of the original sample added. Samples of 2.9 wt/wt % and 4.8 wt/wt % microbial cellulose were each processed in a Waring® laboratory blender at maximum speed for a period of 3 minutes. A particles size analysis was then performed on each sample. The results are shown in the table below.

EXAMPLE 5

A series of tests were undertaken to determine the effect that varying concentrations of microbial cellulose in the pulp had on the suitability of the pulp as a plant growth media. Each sample was blended for 2 minutes, with separate 0.5 wt/wt % samples being further processed for 3 mins and 5 mins. Each sample was then transferred to translucent plastic trays until the top of the tray was reached (1.7 cm). Each tray was then allowed to drain out until field capacity was reached. The resulting residue height was measured.

| wt/wt % of Microbial Cellulose in Pulp | Height of Residue (cm) | Time to Field Capacity (min) |
|---|---|---|
| 0.1 | 0.1 | 5 |
| 0.25 | 0.2 | 5 |
| 0.5, 2 min | 0.7 | 15 |
| 0.5, 3 min | 0.8 | 15 |
| 0.5, 5 min | 0.4 | 2 |
| 0.75 | 1 | 25 |
| 1 | 0.9 | 25 |
| 1.5 | 1.3 | 5 |
| 2.0 | 2.0 | Not saturated |

Photos of each sample at field capacity are shown in FIGS. 3a-i. The pulp was poured into plastic tray at differing concentrations and allowed to drain for approximately one hour to reach field capacity. The plastic tray has a 2 mm holes per 1 cm² drilled into the base, to allow the water to drain from the pulp. If the pulp contained too low a concentration of microbial cellulose, then the water drained out reducing the amount of microbial cellulose for the seeds to grow on. This is seen in the 0.1 and 0.25 wt/wt % treatment. The 0.5 wt/wt % macerated for 5 mins also showed a reduction of pulp in the plastic trays due to the small particle size distribution that drained with the water out through the drain holes. The 0.75 wt/wt %, 1.0 wt/wt %, 1.5 wt/wt % and 2.0 wt/wt % treatments left enough microbial cellulose pulp in the tray, once field capacity was achieved, to hold enough water for good seedling germination and subsequent growth. The pulp of the 2.0 wt/wt % sample exhibited more solid like properties and was not pourable. The inventors believe that the higher concentration resulted in a smaller microbial cellulose fraction being macerated. As a larger amount of the dense network of nanocellulose fibres remains, the pulp remains more solid.

1.85 g of Eruca Sativa seeds were then added to each tray and the trays were then covered with perforated parafilm. The growth of the plants in each sample at 63 hours is shown in FIGS. 4a-i. After 63 hours plants were watered periodically every 7 and 10 hours (approximately). The germination temperature ranged from 19° C. to 32.8° C.

Photos of the trays were taken at 95 hours and the results are shown in FIGS. 5a-i.

Photos of the trays were taken at 141 hours and the results are shown in FIGS. 6a-i.

Growth was measured for each sample periodically and the results are shown below

| Blending Time (minutes) | Concentration (wt/wt %) | >4.75 mm | 4.75-2.0 mm | 2.0-1.0 mm | 1.0-0.5 mm | 0.5-0.25 mm | <0.25 mm |
|---|---|---|---|---|---|---|---|
| 3 (Waring) | 2.9 | 90% | 10% | — | — | — | — |
| 3 (Waring) | 4.8 | 95% | 5% | — | — | — | — |

16

| Growth | 63 hrs | 71 hrs | 95 hrs | 112 hrs | 141 hrs |
|---|---|---|---|---|---|
| 0.1 wt/wt % | 2.2 | 2.5 | 2.6 | 2.6 | 3.3 |
| 0.25 wt/wt % | 1.4 | 2 | 2.5 | 2.7 | 2.5 |
| 0.5 wt/wt %, 2 min | 1.1 | 2 | 3.3 | 3.1 | 2.7 |
| 0.5 wt/wt %, 3 min | 1.3 | 2 | 2.4 | 3.1 | 2.8 |
| 0.5 wt/wt %, 5 min | 1 | 1 | 1 | 1 | 1.6 |
| 0.75 wt/wt % | 1.7 | 2.6 | 3.3 | 3.6 | 4.2 |
| 1 wt/wt % | 1.6 | 2.3 | 3 | 3.5 | 4.3 |
| 1.5 wt/wt % | 1.7 | 2.5 | 3 | 3.5 | 4 |
| 2.0 wt/wt % | 1.5 | 2.4 | 2.8 | 3.7 | 4.1 |

Figure 7:
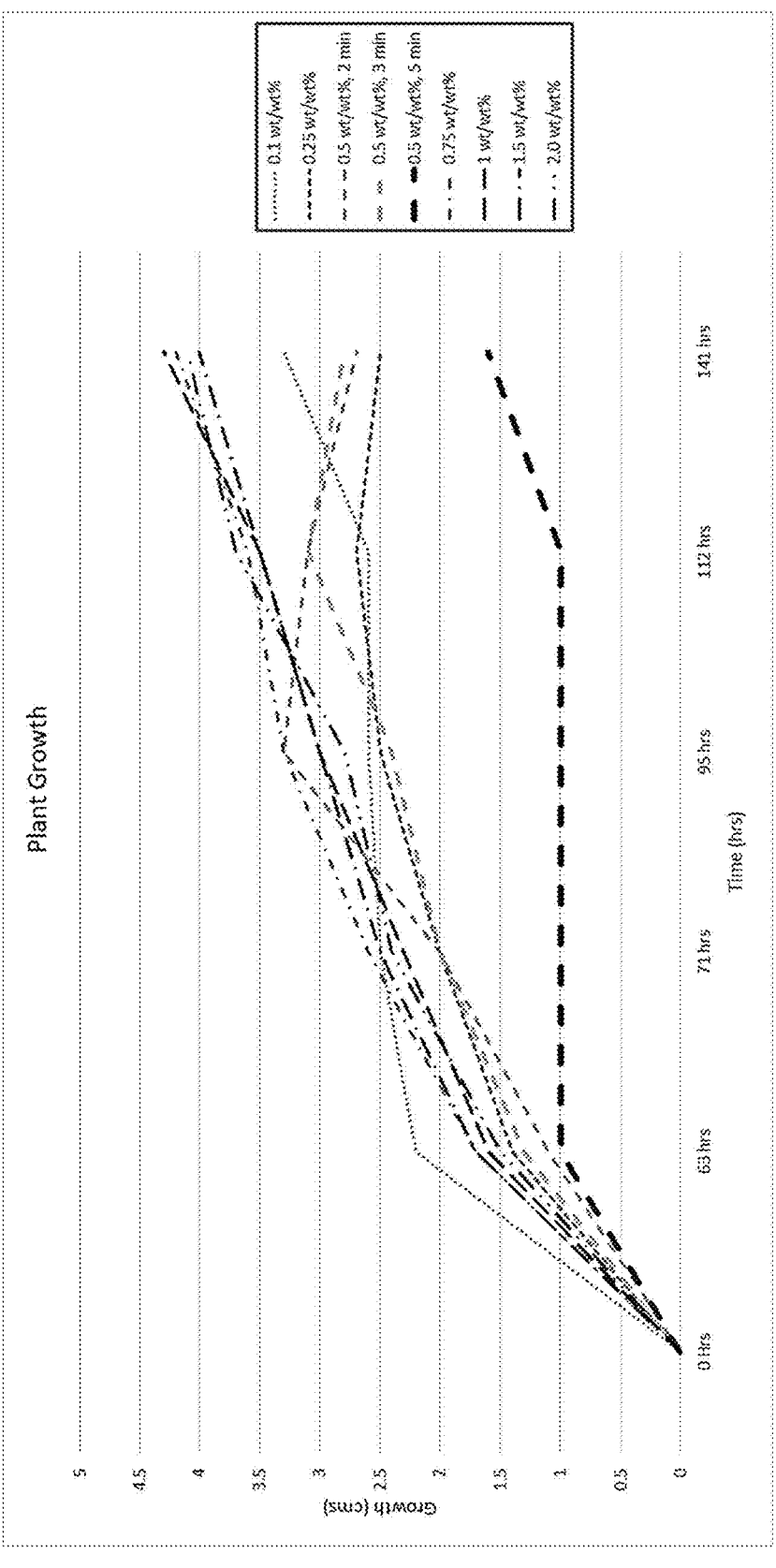
FIG. 7 is graph plotting the growth of the plant on each of the plant growth substrates of FIG. 3.

For comparison purposes, these results were plotted in a graph and the results are shown in FIG. 7.

With less microbial cellulose pulp remaining in the tray, after field capacity was achieved, the less water was held in the tray therefore less water available for seed germination and plant growth. As can be seen from the results, 0.5 wt/wt % sample that underwent homogenisation for 5 minutes demonstrated poor plant growth. The inventors believe that the reduced particle size of this sample meant that most of the MC media was lost through the drain holes resulting in a less pulp and less water to support plant growth. Product. Some plant growth reduced after 95 hours, e.g. 0.25 wt/wt %, due to the lack of available water. Excellent plant growth was achieved in the 0.75 wt/wt %, 1.0 wt/wt %, 1.5 wt/wt % and 2.0 wt/wt % treatments due to an increased water availability compared to the other samples.

Comparative Example

As discussed above, the wet microbial cellulose (prior to the homogenisation step) forms as a gelatinous substrate of dense fibres. These fibres do not allow for the roots to penetrate through the substrate. In order to compare the physical properties of the wet microbial cellulose to the pulp of the present invention a series of microbial cellulose pellicles were produced. Three pellicles of wet microbial cellulose each with a diameter 10.5 cm were produced. Two of the pellicles had a thickness of 1 cm and the third pellicle had a thickness of 0.5 cm. The wet microbial pellicles were weighed and then dried in an oven for two hours to remove the water, before being weighed again. This allowed the calculation of both the wt/vol % and the wt/wt % of the wet microbial pellicles. The results are shown below.

| Pellicle | Thickness | volume (cm^3) | wet weight | dry weight | wt/ vol % | wt/ wt % | Density (g/cm3) |
|---|---|---|---|---|---|---|---|
| 1 | 0.5 | 43.3 | 39 | 1.1 | 2.54 | 2.82 | 0.025 |
| 2 | 1 | 86.5 | 76 | 2.5 | 2.89 | 3.29 | 0.029 |
| 3 | 1 | 86.5 | 83 | 3.3 | 3.82 | 3.98 | 0.038 |

The range of microbial cellulose concentration in an unadulterated pellicle is 2.5-3.8 wt/vol %. It is understood by the inventors that the homogenisation process of the present invention will reduce the particle size of the microbial cellulose, allowing it to disperse through the aqueous medium to a greater extent. As the wt/vol % of the pulp approaches 2.5 wt/vol % the pulp becomes as thick as the unadulterated pellicle. This will not allow for the penetration of the plant roots and is therefore not suitable for seed germination and plant growth.

As discussed above, the bulk density of the pulp produced by the homogenization process is 0.005 and 0.015 g/cm$^3$. This is a significant reduction in the bulk densities calculated above for the unprocessed wet microbial cellulose. This demonstrates the increase in water holding capacity the pulp has over the unprocessed wet microbial cellulose. As would be appreciated by a person skilled in the art, the increase capacity to hold water is particularly advantageously for supporting plant growth.

Those skilled in the art will appreciate that the invention described herein is susceptible to variations and modifications other than those specifically described. The invention includes all such variation and modifications. The invention also includes all of the steps, features, formulations and compounds referred to or indicated in the specification, individually or collectively and any and all combinations or any two or more of the steps or features.

The invention claimed is:

1. A method for producing a plant growth media, the method comprising:

subjecting a wet fibrous microbial cellulose material to a homogenisation process to produce a plant growth media comprised of a pulp that comprises between 0.1 and 2.5 wt/wt % fibrous microbial cellulose, has a bulk density of 0.005-0.015 g/cm$^3$, and has a particle size distribution such that the D90 is between 750 and 1500 μm and the D10 is at least 40 μm, wherein particle size distribution is measured by laser diffraction analysis (Mie Theory) if the concentration of the fibrous microbial cellulose is 0.1-1.0 wt/wt %, or measured with sieving if the concentration of the fibrous microbial cellulose is between 1.0 and 2.5 wt/wt %.

2. The method according to claim 1, wherein the fibrous microbial cellulose material is produced by a bacterium species selected from the group comprising *Sarcina* sp., *Agrobacterium* sp. and *Acetobacter* sp.

3. The method according to claim 1, wherein the homogenisation process is selected from any one of mechanical or pressure homogenisation processes.

4. The method according to claim 1, wherein the homogenisation process is performed in a homogenization apparatus.

5. The method according to claim 4, wherein the homogenization apparatus is a blender.

6. The method according to claim 1, wherein the particle size distribution of the pulp is such that the D50 is between 330 and 800 μm.

7. The method according to claim 1, wherein the particle size distribution of the pulp is such that the D10 is between 40 and 150 μm.

8. The method according to claim 1, further comprising a step, prior to the step of subjecting the wet fibrous microbial cellulose material to a homogenisation process, of:

separating fibrous microbial cellulose material from a microbial culture growth media to produce wet fibrous microbial cellulose material.

9. The method according to claim 1, further comprising a step, prior to the step of subjecting the wet fibrous microbial cellulose material to a homogenisation process, of:

applying an aqueous solution to dry fibrous microbial cellulose material to produce the wet microbial cellulose material.

10. The method according to claim 9, wherein the dry fibrous microbial cellulose material is subjected to a size reduction step prior to the application of an aqueous solution to produce the wet fibrous microbial cellulose material.

11. The method according to claim 9, wherein the method further comprises a step of controlling the water content of the wet fibrous microbial cellulose material.

12. The method according to claim 1, wherein the viscosity of the pulp is between 0.0030 and 0.088 Pa·s.

13. The method according to claim 1, further comprising a step, prior to the step of subjecting a wet fibrous microbial cellulose material to a homogenisation process, of:

washing the wet fibrous microbial cellulose material.

14. The method according to claim 13, wherein the step of washing the wet fibrous microbial cellulose material comprises heating the wet fibrous microbial cellulose material in water at a temperature between 60° C. and 100° C.

15. The method according to claim 1, wherein the pulp is pourable.

16. The method according to claim 1, wherein the plant growth medium consists essentially of the fibrous microbial cellulose material and water or nutrient solution.

17. A plant growth media, the plant growth media comprising a pulp of fibrous microbial cellulose material, wherein the pulp comprises between 0.1 and 2.5 wt/wt % fibrous microbial cellulose, wherein the pulp has a bulk density of 0.005-0.015 g/cm³, and wherein the particle size distribution of the pulp is such that the D90 is between 750 and 1500 µm and the D10 is at least 40 µm, wherein particle size distribution is measured by laser diffraction analysis (Mie Theory) if the concentration of the fibrous microbial cellulose is 0.1-1.0 wt/wt %, or measured with sieving if the concentration of the fibrous microbial cellulose is between 1.0 and 2.5 wt/wt %.

18. The plant growth media according to claim 17, wherein the concentration of the fibrous microbial cellulose is between 0.2 and 2.0 wt/wt %.

19. The plant growth media according to claim 17, wherein the D90 is between 1000 and 1400 µm.

20. The plant growth media according to claim 17, wherein the particle size distribution of the pulp is such that the D50 is between 330 and 800 µm.

21. The plant growth media according to claim 17, wherein the particle size distribution of the pulp is such that the D10 is between 40 and 150 µm.

22. The plant growth media according to claim 17, wherein the gravimetric water capacity (θg) of the pulp at field capacity is between 71.6-76.5 g H₂O/g dry fibrous microbial cellulose.

23. The plant growth media according to claim 17, wherein the plant growth medium consists essentially of the fibrous microbial cellulose material and water or nutrient solution.

24. A plant growth media comprising a pulp of fibrous microbial cellulose material, having a bulk density of 0.005-0.015 g/cm³ and a particle size distribution of the pulp such that the D90 is between 750 and 1500 µm and the D10 is at least 40 µm, wherein particle size distribution is measured by laser diffraction analysis (Mie Theory) if the concentration of the fibrous microbial cellulose is 0.1-1.0 wt/wt %, or measured with sieving if the concentration of the fibrous microbial cellulose is between 1.0 and 2.5 wt/wt %.

25. The plant growth media according to claim 24, wherein the D90 is between 1000 and 1400 µm.

26. The plant growth media according to claim 24, wherein the particle size distribution of the pulp is such that the D50 is between 330 and 800 µm.

27. The plant growth media according to claim 24, wherein the particle size distribution of the pulp is such that the D10 is between 40 and 150 µm.

28. The plant growth media according to claim 24, wherein the gravimetric water capacity (θg) of the pulp at field capacity is between 71.6-76.5 g H₂O/g dry fibrous microbial cellulose.

* * * * *